Dec. 1, 1959 A. J. SCHIEWE ET AL 2,915,710
MAGNETIC COUPLED TRANSISTOR OSCILLATOR
Filed Aug. 29, 1955
Fig. 1.
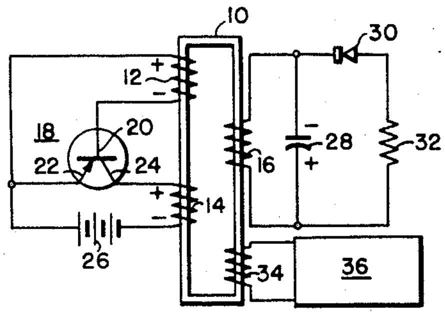
Fig. 2.
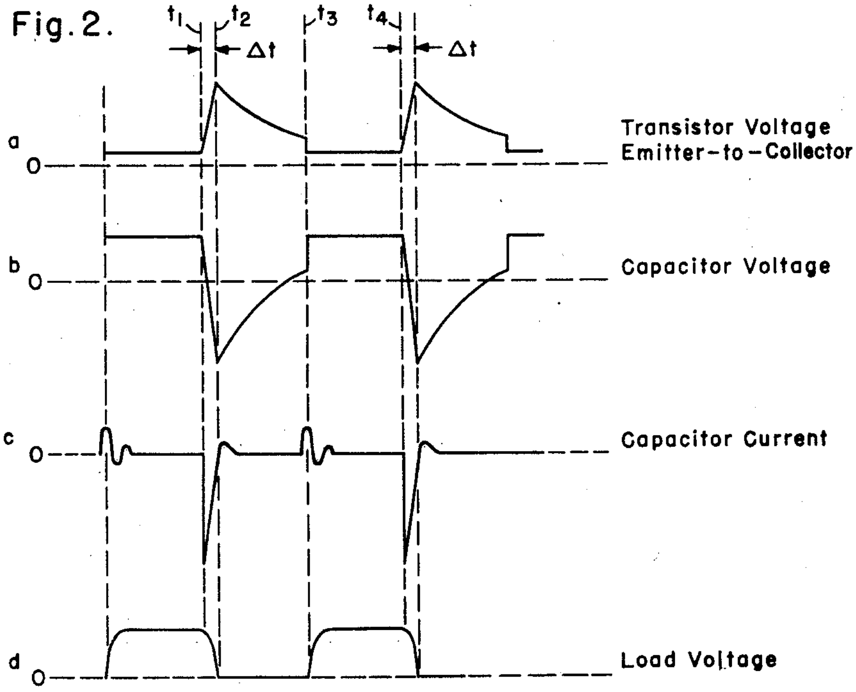
Fig. 3. Fig. 4.
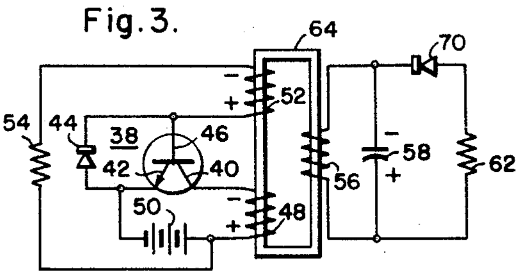
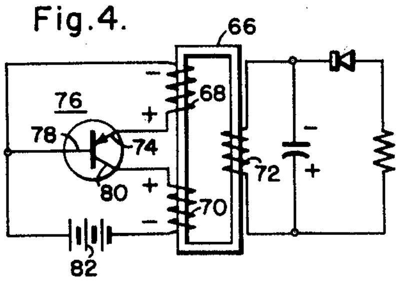
WITNESSES
Edwin E. Baessler
J. N. Murray
INVENTORS
Arthur J. Schiewe
and Kan Chen
BY
F. E. Browder
ATTORNEY United States Patent Office 2,915,710

Patented Dec. 1, 1959

2,915,710

MAGNETIC COUPLED TRANSISTOR OSCILLATOR

Arthur J. Schiewe and Kan Chen, Wilkinsburg, Pa., assignors to Westinghouse Electric Corporation, East Pittsburgh, Pa., a corporation of Pennsylvania Application August 29, 1955, Serial No. 531,159

4 Claims. (Cl. 331—112)

This invention relates to transistor oscillators and more particularly, to an oscillator utilizing a single transistor as a switch for converting a direct-current input to an oscillatory output.

Prior to this invention, oscillators have been proposed for converting a direct-current input to a square-wave output. One of these oscillators is described in copending application Serial No. 421,350 of R. L. Bright and G. H. Royer, filed April 6, 1954, now Patent No. 2,783,384, and assigned to the assignee of the present application. It employs a magnetic core of rectangular hysteresis loop material together with two junction transistors operated as control switches. In this circuit, the flux density of the core member swings between opposite saturation levels to achieve oscillation. Another application, Serial No. 435,123, of G. F. Pittman, Jr., R. L. Bright and G. H. Royer filed June 8, 1954, now abandoned, and assigned to the assignee of the present application, describes an oscillator circuit in which a single transistor is used in conjunction with a magnetic core member of rectangular hysteresis loop material. In this case, the flux density of the core member does not swing between saturation levels as is the case with the circuit referred to above. Rather, the flux density reaches saturation in one direction only, and the core resets at an unsaturated level during each cycle of operation of the oscillator. With this arrangement, it is possible to adjust the point of flux reset during the period of the cycle that the core is unsaturated to thereby vary the ratio of output pulse width to frequency. In this circuit, however, it was found necessary to use an auxiliary source of voltage pulses to trigger each cycle of the oscillator.

It is a primary object of this invention to provide an improved single transistor oscillator which is self-excited by means of a regenerative feed-back voltage.

A more general object of the invention is to provide a new and improved transistor oscillator for converting a direct-current input into a square-wave output.

A still further object of the invention lies in the provision of a new and improved transistor oscillator of the type described above which uses a saturable magnetic core member of rectangular hysteresis loop material in conjunction with a single semi-conductive device.

The above and other objects and features of the invention will become apparent from the following detailed description taken in connection with the accompanying drawings which form a part of this specification and in which:

Fig. 1 is a schematic diagram of one embodiment of our invention;

Figs. 2*a*, 2*b*, 2*c* and 2*d* are wave forms representing the voltages appearing across various points in the circuit shown in Fig. 1;

Fig. 3 is another embodiment of the invention utilizing a silicon transistor; and Fig. 4 is still another embodiment of the invention using a transistor having a common base connection for the two windings associated therewith.

Referring to Fig. 1, the circuit shown comprises a saturable magnetic core member 10 having three main windings 12, 14 and 16 inductively coupled thereto. Core 10 is made from substantially rectangular hysteresis loop material, the characteristics of which are well known to those skilled in the art. Associated with windings 12 and 14 is a PNP junction transistor 18 having a base 20, an emitter 22, and a collector 24. As is well known to those skilled in the art, the PNP junction transistor consists of a region of n-type germanium bounded by two p-type regions. Non-rectifying contacts are fastened to the three germanium regions, the one attached to the n-type region being called the base and the other two attached to the two p-type regions being called the emitter and collector respectively. The junctions between the n-type and p-type germanium act as rectifiers. Only a small leakage current flows from emitter to collector when the n-type base is positive relative to the adjoining p-type regions, whereas a relatively large current flows when the base is negative relative to the p-type emitter by as little as a fraction of a volt.

As shown, base 20 is connected through winding 12 to emitter 22, and collector 24 is connected through winding 14 and a source of direct-current voltage, such as battery 26, to emitter 22. A capacitor 28 forms a parallel resonant circuit with winding 16. Connected in shunt with this capacitor are a rectifier 30 and a load impedance 32. A fourth winding 34 inductively coupled to core member 10 is equipped with a source of variable current 36 and is used to vary the frequency and time duration of the output pulses from the oscillator in a manner hereinafter described.

If it is assumed, initially, that the flux density in core 10 is substantially zero, the only current through the transistor 18 will be the leakage current which flows in the absence of a negative bias on base 20. This leakage current flowing through winding 14 with the polarity shown will induce flux in core member 10. The flux, in turn, will induce a voltage across winding 12 with a polarity tending to bias base 20 negative relative to emitter 22 and collector 24. Hence, transistor 18 is easily started into conduction by its own leakage through winding 14 and the resulting positive voltage feed-back action through the base winding 12. As the transistor continues to conduct, core member 10 will reach saturation. Consequently, the voltage induced in windings 12 and 16 will collapse and reduce to zero, and transistor 18 will cut off because of insufficient base drive. That is, the transistor will cut off since the voltage across winding 12 will now decrease to the point where base 20 will no longer be biased negative relative to emitter 22 and collector 24 in an amount sufficient to maintain conduction. During the period of flux build-up in core 10, capacitor 28 will be charged with the polarity shown in Figure 1. After saturation is reached and the induced voltage across winding 16 drops to zero, the flux in core 10 reverses its direction of variation, and current will flow through winding 16 to charge capacitor 28 with a polarity opposite to that shown in the drawings. Capacitor 28 will thereafter release its stored energy through winding 16, thereby driving the core 10 to a condition of unsaturation.

Operation of the circuit of Fig. 1 may best be understood by reference to Fig. 2. During the period that transistor 18 conducts, its emitter-to-collector voltage is relatively constant. When core 10 saturates at time $t_1$, the transistor cuts off and its emitter-to-collector voltage takes a sharp rise during the time interval $\Delta t$ (greatly exaggerated in Fig. 2). During this time the voltage across capacitor 28 drops from a positive to a negative value while the capacitor current surges to a maximum negative value and returns to zero. Between time $t_2$ and $t_3$, the core 10 resets at an unsaturated level. Between times $t_3$ and $t_4$ transistor 18 again conducts. Consequently, the emitter-to-base voltage of transistor 18 decreases, and the voltage across winding 16 increases to a steady state value, determined by the voltage from battery 26. The damping of the tank circuit of winding 16 and capacitor 28 must be sufficiently small so that the voltage across winding 16 will overshoot and become positive again (Fig. 2*b*), starting the next cycle of circuit oscillation by providing base drive for transistor 18.

The rectifier 30 is not necessary for oscillation of the circuit of Fig. 1. The purpose of the rectifier is to block the negative voltage appearing across capacitor 28 so that the output voltage will be rectangular in form as shown in Fig. 2*d*. In some cases the capacitor 28 may not be necessary for oscillation because of the distributed capacitance associated with winding 16. The use of a large external capacitance has the advantages of swamping out stray capacitances which would be difficult to reproduce or hold constant, and of reducing the peak negative induced voltage which the rectifier 30 must block.

Variable current source 36 and winding 34 may be used to vary the ratio of output pulse width to the period of oscillation by changing the degree of flux build-up in the reverse direction from saturation during a cycle of oscillation. Thus, if it is desired to increase pulse width and decrease frequency, the current from source 36 will be adjusted to permit the flux density in core 10 to depart further from the point of saturation, and if it is desired to increase frequency and decrease output pulse width, the current will be adjusted to reduce the amount of flux density departure from saturation.

The embodiment of the invention shown in Fig. 3 operates in substantially the same way as that of Fig. 1. However, in this case a silicon NPN transistor 38 is used. With this arrangement, the output frequency of the circuit changes only 3% over a temperature range from room temperature to plus 80° C. The NPN silicon transistor is similar in operation to the PNP germanium type already described, but in this case, the transistor consists of a region of n-type silicon bounded by two p-type silicon regions. Current flow through the transistor, in the conventional sense, is from collector 40 to emitter 42. A diode 44 is connected between emitter 42 and base 46 to limit the emitter-to-base voltage below a permissible maximum value. Collector 40 is connected to emitter 42 through a winding 48 and a battery 50. In order to initiate conduction in transistor 38, it is necessary to connect base 46 to the positive terminal of battery 50 through winding 52 and resistor 54. The output winding for the circuit is identical to that of Fig. 1, comprising a winding 56 in shunt with a capacitor 58, and a rectifier 70 and load impedance 62 in shunt with the capacitor. Each of the windings 48, 52 and 56 is disposed in inductive relationship with respect to saturable magnetic core member 64.

The operation of the circuit shown in Fig. 3 is identical to that of the circuit shown in Fig. 1 except that the polarities of windings 48 and 52 are reversed. This condition results from the use of an NPN junction transistor.

In Fig. 4, a still further embodiment of the invention is shown and comprises a magnetic core member 66 having three windings 68, 70 and 72 inductively coupled thereto. Winding 68 serves to connect the emitter 74 of PNP transistor 76 to its base 78. Base 78 is also connected to collector 80 through winding 70 and a battery 82. With this arrangement, leakage current through the transistor will induce a voltage across winding 70 with the polarity shown. The resulting flux build-up in core 66 will induce a voltage in winding 68 as shown tending to bias emitter 74 positive relative to base 78. Hence, conduction through transistor 76 is easily initiated by a positive feed-back action similar to that of the circuits already described. The output circuit for this embodiment is identical to that shown in Figs. 1 and 2. The only difference in operation between the circuit shown in Fig. 1 and that in Fig. 4 is the polarity reversal of windings 12 and 68. This is due to the fact that the emitter-to-base circuits of the two embodiments are reversed. Otherwise, the operation of the circuits is the same.

Although we have described our invention in connection with certain specific embodiments, it will be apparent to those skilled in the art that various changes in form and arrangement of parts can be made to suit requirements without departing from the spirit and scope of the invention. In this respect, it should be apparent that any one of a number of different types of transistors could be used in the present invention just as long as a saturable magnetic core device is used to achieve base drive by a regenerative feed-back action.

We claim as our invention:

1. An oscillatory circuit comprising a single semiconductve device of the type having an emitter, a collector and a base, first winding means directly connecting said emitter with said base, second winding means and a source of voltage in series connecting said collector with said emitter, third winding means, a saturable core member disposed in inductive relationship with respect to said first, second and third winding means, a capacitor in shunt with said third winding means, a load impedance, a rectifier, and circuit means connecting said load impedance and said rectifier in series across said capacitor.

2. An oscillatory circuit comprising a semiconductive device of the type having an emitter, a collector and a base, first winding means connecting said emitter with said base, second winding means and a source of voltage connecting said collector with said base, third winding means, a saturable magnetic core member disposed in inductive relationship with respect to said first, second and third winding means, a capacitor in shunt with said third winding means, an output load impedance, a rectifier, and circuit means connecting said load impedance and said rectifier in series across said capacitor.

3. An oscillatory circuit comprising a saturable magnetic core member, a switching device, means for driving said core member to saturation when said switching device is open, a single element inductively associated with said core member for controlling operation of said switching device, said element being adapted to close the switching device when the core member is saturated, winding means disposed in inductive relationship with respect to said core member, and a capacitor connected in shunt with said winding means whereby the capacitor is charged when the flux density in said core member is approaching saturation in one direction, said capacitor being discharged when said core member becomes saturated to thereby reverse the flux in said core member and drive it to a condition of unsaturation.

4. In an oscillatory circuit, a saturable magnetic core member, a single switching device, means for driving said core member to saturation when said switching device is open, a single element inductively associated with said core member for controlling operation of said switching device, winding means disposed in inductive relationship with respect to said core member, and means associated with said winding means for reversing the flux in said core member whenever the core member becomes saturated.

References Cited in the file of this patent

UNITED STATES PATENTS 2,791,739 Light ---------------- May 7, 1957

FOREIGN PATENTS 684,626 Great Britain ---------- Dec. 24, 1952

OTHER REFERENCES

Article: "Transistors As On-Off Switches in Saturable Core Circuits," by Bright et al., pages 79–82 of Electrical Manufacturing for December 1954.